US011652943B2

(12) United States Patent
Kawase et al.

(10) Patent No.: US 11,652,943 B2
(45) Date of Patent: May 16, 2023

(54) IMAGE PROCESSING APPARATUS FOR WRITING DATA BASED ON WRITE LIFETIME OF MEMORIES AND NON-TRANSITORY COMPUTER READABLE MEDIUM

(71) Applicant: FUJIFILM Business Innovation Corp., Tokyo (JP)

(72) Inventors: Fumiyoshi Kawase, Kanagawa (JP); Katsuma Nakamoto, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 34 days.

(21) Appl. No.: 17/325,237

(22) Filed: May 20, 2021

(65) Prior Publication Data

US 2022/0166887 A1 May 26, 2022

(30) Foreign Application Priority Data

Nov. 26, 2020 (JP) .............................. JP2020-196105

(51) Int. Cl.
*G06K 15/00* (2006.01)
*H04N 1/00* (2006.01)
*G06F 3/06* (2006.01)

(52) U.S. Cl.
CPC ......... *H04N 1/0097* (2013.01); *G06F 3/0616* (2013.01); *G06F 3/0659* (2013.01); *G06F 3/0679* (2013.01); *H04N 2201/0094* (2013.01)

(58) Field of Classification Search
None
See application file for complete search history.

(56) References Cited

U.S. PATENT DOCUMENTS

| 10,852,979 | B1 * | 12/2020 | Popli ....................... G06F 3/061 |
| 11,249,652 | B1 * | 2/2022 | Kuzmin ................ G06F 3/0685 |
| 2008/0140918 | A1 * | 6/2008 | Sutardja .............. G06F 12/0246 |
| | | | 711/E12.001 |
| 2008/0183952 | A1 * | 7/2008 | Rikitake ............. G06F 11/1076 |
| | | | 711/E12.008 |
| 2009/0122137 | A1 * | 5/2009 | Mambakkam ....... G06K 7/0013 |
| | | | 348/143 |

FOREIGN PATENT DOCUMENTS

JP 2013152661 8/2013

* cited by examiner

*Primary Examiner* — Dung D Tran
(74) *Attorney, Agent, or Firm* — JCIPRNET

(57) ABSTRACT

An image processing apparatus includes a first memory, a second memory, and a processor configured to write data related to a processing instruction that is inputted into the apparatus to the second memory instead of the first memory when a write lifetime of the first memory is less than a first lifetime threshold, based on state information about a state of the first memory.

9 Claims, 2 Drawing Sheets

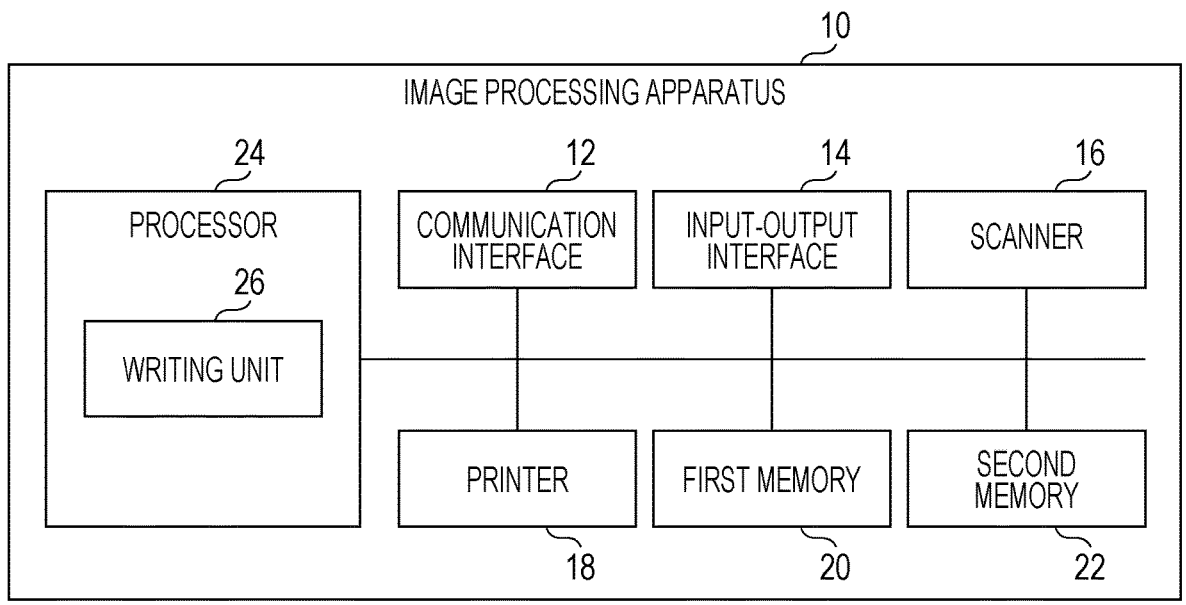

IMAGE PROCESSING APPARATUS FOR WRITING DATA BASED ON WRITE LIFETIME OF MEMORIES AND NON-TRANSITORY COMPUTER READABLE MEDIUM

CROSS-REFERENCE TO RELATED APPLICATIONS

This application is based on and claims priority under 35 USC 119 from Japanese Patent Application No. 2020-196105 filed Nov. 26, 2020.

BACKGROUND

(i) Technical Field

The present disclosure relates to an image processing apparatus and a non-transitory computer readable medium.

(ii) Related Art

Various kinds of memories have been provided. Among them, a memory has a write lifetime. The write lifetime is a parameter that depends on, for example, the number of times data is written to the memory or the total amount of the data that is written to the memory until data is no longer writable to the memory. A representative example of the memory that has the write lifetime is a NAND memory.

An existing image processing apparatus that has been proposed includes a memory that has the write lifetime. For example, Japanese Unexamined Patent Application Publication No. 2013-152661 discloses that an image processing apparatus includes a flash ROM that has the write lifetime that depends on the number of times data is written and outputs a warning to a user when the number of times data is written to the flash ROM is equal to or more than a predetermined threshold.

SUMMARY

As for an image processing apparatus that includes a memory that has the write lifetime, it is tried to increase a period to the end of the write lifetime of the memory as much as possible in some cases. The increase in the period enables a measure to be taken such as the replacement of the memory until the end of the write lifetime of the memory.

Aspects of non-limiting embodiments of the present disclosure relate to the increase in the period to the end of the write lifetime of the memory to a period longer than that in the case where data related to a processing instruction is entirely written to the memory of the image processing apparatus.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided an image processing apparatus including a first memory, a second memory, and a processor configured to write data related to a processing instruction that is inputted into the apparatus to the second memory instead of the first memory when a write lifetime of the first memory is less than a first lifetime threshold, based on state information about a state of the first memory.

BRIEF DESCRIPTION OF THE DRAWINGS

An exemplary embodiment of the present disclosure will be described in detail based on the following figure, wherein:

FIG. 1 schematically illustrates the structure of an image processing apparatus according to the exemplary embodiment;

FIG. 2 illustrates a table that represents memories to which the data of a job is written with respect to a combination of the write lifetime of a first memory and attribute information about attributes of the job.

DETAILED DESCRIPTION

Figure 3:
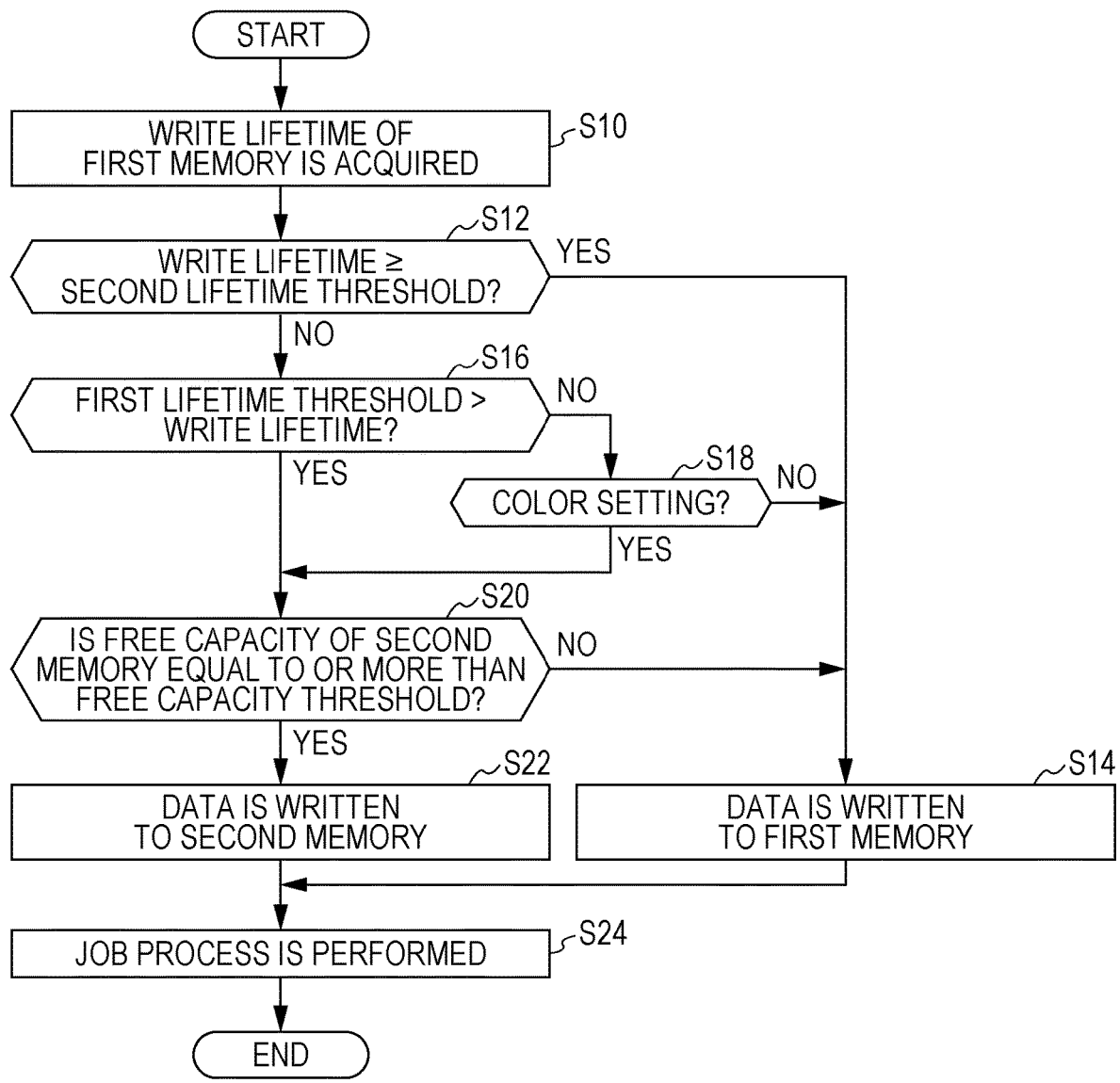
FIG. 3 is a flowchart illustrating the flow of processing of the image processing apparatus according to the exemplary embodiment.

FIG. 1 schematically illustrates the structure of an image processing apparatus 10 according to an exemplary embodiment. The image processing apparatus 10 performs a process related to a job in response to the job to execute a processing instruction that is inputted from a user. A representative example of the image processing apparatus 10 is a multi-function peripheral that has a print function, a scan (image reading) function, a copy function, and a FAX transmission function. The image processing apparatus 10, however, may be any apparatus, provided that the apparatus performs the process related to the inputted job. In an example described according to the exemplary embodiment, data related to the job is image data. The data related to the job, however, is not limited to image data.

A communication interface 12 includes, for example, a network adapter. The communication interface 12 has a function of communicating with another apparatus (for example, a user terminal that the user uses) via a communication line such as a local area network (LAN).

In particular, the communication interface 12 receives the job with data to be processed from the user terminal. An example of the job is a print job to cause the image processing apparatus 10 to perform a print process. The print job includes attribute information about attributes of the print process and image data (to be processed by the print process) related to the print job. The attribute information includes setting information about settings of the print job and information about attributes (particularly, a logical page number) of the image data related to the print job. The setting information related to the print job includes, for example, information about a print color setting (color or monochrome).

An input-output interface 14 includes, for example, an input interface such as a touch screen or a button and an output interface such as a display or a speaker.

The input interface is used by the user to input various instructions into the image processing apparatus 10. For example, the user may place manuscript paper on a paper tray (not illustrated) of the image processing apparatus 10 and input, from the input interface, a scan job to cause the image processing apparatus 10 to perform a scan process. The scan job includes attribute information about attributes related to the scan process. The attribute information includes setting information about settings of the scan job and information about attributes (particularly, the number of pieces of the paper) of the manuscript paper related to the scan job. The setting information related to the scan job includes, for example, information about scan color (color or monochrome) or scanning resolution. A scanner 16 described later optically reads the manuscript paper that is placed on the paper tray in response to the scan job and acquires image data related to the scan job. Similarly, the user may input, from the input interface, a copy job to cause the image processing apparatus 10 to perform a copy process (a process of printing the image data that is acquired by scanning the manuscript paper on a print medium) or a FAX job to cause the image processing apparatus 10 to perform a FAX transmission process (a process of transmitting the image data that is acquired by scanning the manuscript paper by using a facsimile. Attribute information about attributes of the copy job or the FAX job includes the same information as the scan job.

The output interface is used to output various kinds of information to the user from the image processing apparatus 10. For example, various screens are displayed on a display that serves as the output interface.

The scanner 16 includes, for example, a light source and a charge coupled device (CCD). The scanner 16 optically reads the manuscript paper and generates the image data depending on the manuscript paper. The scanner 16 optically reads the manuscript paper that is placed on the paper tray and acquires the image data related to the job in the case where the user inputs the scan job, the copy job, or the FAX job into the image processing apparatus 10 as described above.

A printer 18 includes, for example, a charging device, a photosensitive drum, tonner, or a print medium conveyance device. The printer 18 forms (prints) an image on the print medium, based on the image data related to the print job in the case where the user inputs the print job into the image processing apparatus 10. The printer 18 forms an image on the print medium, based on the image data that is acquired by the scanner 16 in response to the copy job in the case where the user inputs the copy job into the image processing apparatus 10.

A first memory 20 is a non-volatile memory and is a memory that has a write lifetime. The first memory 20 may be any kind of memory, provided that the memory has the write lifetime. For example, the first memory 20 may be a NAND memory. Examples of the NAND memory include a solid state drive (SSD), an embedded multimedia card (eMMC), and a SD card.

The write lifetime is a parameter that depends on, for example, the number of times data is written to the first memory 20 or the total amount of the data that is written to the first memory 20 until data is no longer writable to the first memory 20 as described above. That is, the write lifetime of the first memory 20 decreases whenever the data is written to the first memory 20. The larger the amount of the data that is written to the first memory 20, the shorter the write lifetime of the first memory 20 as a result of the data being written.

The first memory 20 may provide state information that represents the state of the first memory 20 in response to a request from a processor 24 described later. An example of the state information is SMART information. The state information that is provided by the first memory 20 includes lifetime information about the write lifetime of the first memory 20. For example, the first memory 20 calculates its own write lifetime, based on the number of times the data has been written to the first memory 20 so far, the total amount (in other words, the sum of the data) of the data that has been written to the first memory 20 so far, or both and information about the calculated lifetime corresponds to the lifetime information. According to the exemplary embodiment, in the SMART information corresponding to the state information, the write lifetime of the first memory 20 is represented by a numerical value of 0 to 100%. In a state in which no data has been written to the first memory 20 (that is, a state before use), the write lifetime is 100%. In a state at the end of the write lifetime, the write lifetime is 0%.

The data related to the job that is inputted into the image processing apparatus 10 is written to the first memory 20. For example, in the case where the print job is inputted into the image processing apparatus 10, the image data that is included in the print job is written to the first memory 20. In the case where the scan job, the copy job, or the FAX job is inputted into the image processing apparatus 10, the image data that is acquired in a manner in which the scanner 16 reads the manuscript paper in response to the job is written to the first memory 20.

The first memory 20 stores an image processing program to operate the components of the image processing apparatus 10.

A second memory 22 is a memory that differs from the first memory 20. According to the exemplary embodiment, the second memory 22 is a volatile memory and is a memory that has no write lifetime. The storage capacity of the second memory 22 may be smaller than that of the first memory 20. A representative example of the second memory 22 is a DRAM.

The second memory 22, however, may be a non-volatile memory and may be a memory that has the write lifetime. In this case, examples of the second memory 22 include NAND memories such as a SSD, an eMMC, and a SD card as in the first memory 20. In the case where the second memory 22 is the memory that has the write lifetime, the second memory 22 may provide state information that includes lifetime information about the write lifetime of the second memory 22 as in the first memory 20.

FIG. 1 illustrates the single second memory 22. The image processing apparatus 10, however, may include multiple second memories 22.

The data related to the job that is inputted into the image processing apparatus 10 may be written to the second memory 22. The image processing apparatus 10 thus includes the first memory 20 and the second memory 22 as memories to which the data related to the job is written. The processor 24 (more specifically, a writing unit 26) described later determines which memory the data related to the job is written to.

The processor 24 is hardware in a broad sense and includes a general processor (for example, a central processing unit (CPU)), a dedicated processing apparatus (for example, a graphics processing unit (GPU)), an application specific integrated circuit (ASIC), a field programmable gate array (FPGA), a programmable logic device, or some or all of these. The processor 24 may not be configured by a single processing apparatus but may be configured by plural processors in collaboration which are located physically apart from each other but may work cooperatively. As illustrated in FIG. 1, the processor 24 has the function of the writing unit 26 that is performed by the image processing program that is stored in the first memory 20.

The writing unit 26 writes the data related to the job that is inputted into the image processing apparatus 10 to the first memory 20 or the second memory 22. Specifically, the writing unit 26 determines which memory the data related to the job is written to, based on the write lifetime of the first memory 20.

The writing unit 26 acquires the write lifetime of the first memory 20 before writing the data related to the job to the memory. Specifically, when the image processing apparatus 10 receives the job from the user, the writing unit 26 requests the first memory 20 to provide the state information and receives the state information from the first memory 20. The writing unit 26 acquires the write lifetime of the first memory 20 by referring the lifetime information that is included in the state information that is received from the first memory 20. According to the exemplary embodiment, the write lifetime of the first memory 20 is represented in the format of "XX %" as described above.

According to one exemplary embodiment, the writing unit 26 writes the data related to the job to the first memory 20 when the write lifetime of the first memory 20 is equal to or more than a first lifetime threshold and writes the data related to the job to the second memory 22 instead of the first memory 20 when the write lifetime of the first memory 20 is less than the first lifetime threshold. The first lifetime threshold is set by, for example, an administrator of the image processing apparatus 10 in advance. For example, if the first lifetime threshold is set to "1%", the writing unit 26 writes the data related to the job to the first memory 20 when the write lifetime of the first memory 20 is 1% or more and writes the data related to the job to the second memory 22 when the write lifetime of the first memory 20 is less than 1%.

In this case, when the write lifetime of the first memory 20 is short (specifically, when the write lifetime is less than the first lifetime threshold), the data related to the job is not written to the first memory 20. Meanwhile, the data related to the job is written to the second memory 22, and the user may use the image processing apparatus 10 as usual. Meanwhile, the administrator of the image processing apparatus 10 may replace the first memory 20.

The processor 24 may send a notification to the administrator of the image processing apparatus 10 when the write lifetime of the first memory 20 becomes less than the first lifetime threshold. For example, the notification may be sent from the input-output interface 14, or a notification signal may be transmitted to a terminal that the administrator uses from the communication interface 12 to send the notification to the terminal. This enables the administrator to be prompted to replace the first memory 20.

In the case where the image processing apparatus 10 includes the multiple second memories 22, when the write lifetime of the first memory 20 is less than the first lifetime threshold, the writing unit 26 acquires the free capacities of the second memories 22 and determines one second memory 22 of the second memories 22 to which the data related to the job is written, based on the free capacities of the second memories 22. For example, the writing unit 26 writes the data related to the job to the second memory 22 that has the maximum free capacity in the second memories 22.

In the case where the multiple second memories 22 include a second memory 22 that has the write lifetime and a second memory 22 that has no write lifetime, the writing unit 26 prioritizes the second memory 22 that has no write lifetime over the second memory 22 that has the write lifetime to write the data related to the job.

In the case where the image processing apparatus 10 includes multiple second memories 22 that have the write lifetimes, the writing unit 26 may receive the state information that includes the lifetime information from the second memories 22 and may determine the second memory 22 to which the data related to the job is written, based on the write lifetimes of the second memories 22. For example, the data related to the job may be written to the second memory 22 that has the maximum write lifetime in the second memories 22.

The writing unit 26 may write the data to the first memory 20 when the free capacity of the second memory 22 (one second memory 22 in the case where the multiple second memories 22 are included) is less than a free capacity threshold even when the write lifetime of the first memory 20 is less than the first lifetime threshold. The free capacity threshold described herein is determined by, for example, the administrator of the image processing apparatus 10 in advance. For example, the free capacity threshold is set to a value larger than the amount of data related to a single job that is presumably inputted into the image processing apparatus 10. The free capacity threshold may be determined depending on the specification of the image processing apparatus 10 such as color printing ability or monochrome printing ability only.

The data related to the job may be written to one second memory 22 that has a relatively large free capacity in the multiple second memories 22, or the data related to the job may be written to the first memory 20 when the free capacity of each second memory 22 is less than the free capacity threshold. This increases a possibility that the data related to the single job is entirely written to one second memory 22. In other words, the data related to the single job is inhibited from being divided and written to multiple memories. The phrase "the data related to the single job is divided and written to multiple memories" represents the case where the data is partly written to the second memory 22, and the rest of the data is written to the first memory 20 or the case where the data is divided and written to multiple second memories 22. In any case, there is a possibility that the memory to which the data related to the job is to be written changes while the job is performed, and the performance of the job delays. The performance of the job related to the data is inhibited from delaying by inhibiting the data related to the single job from being divided and written to multiple memories.

The writing unit 26 may select the memory to which the data related to the job is to be written from the first memory 20 and the second memory 22, based on attribute information about attributes of the job that the user inputs into the image processing apparatus 10. The attribute information includes the setting information about settings of the job and the information about attributes of the data related to the job as described above. In particular, the attribute information represents the amount of the data related to the job.

The attribute information about attributes of the job represents the amount of the data related to the job. The writing unit 26 may determine the memory to which the data is to be written, based on the amount of the data related to the job that is presumed from the attribute information about attributes of the job as described later. It is also thought that the writing unit 26 analyzes the data related to the job and directly acquires the amount of the data. The writing unit 26, however, determines the memory to which the data is to be written, based on the amount of the data. Accordingly, the writing unit 26 needs to acquire the amount of the data before writing the data related to the job to the memory. The analysis of the data related to the job and acquisition of the amount of the data need temporarily writing the data to the memory, and it is impossible to analyze the data before the data is written to the memory. Accordingly, the writing unit 26 does not analyze the data related to the job but presumes the amount of the data related to the job, based on the attribute information about attributes of the job that is included in the job.

For example, when the print color setting in the setting information about settings of the print job is color, there is a high possibility that the image data related to the print job is a color image. When the print color setting is monochrome, there is a high possibility that the image data related to the print job is a monochrome image a data amount of which is smaller than that of a color image. That is, when the print color setting of the print job is color, the amount of the image data is larger than that in the case where the print color setting is monochrome. The larger the logical page number of the image data, the larger the amount of the image data. Accordingly, the logical page number in the setting information about settings of the print job also represents the amount of the image data related to the print job.

When a scan color setting in the setting information about settings of the scan job, the copy job, or the FAX job is color, the image data related to the job is a color image. When the scan color setting is monochrome, the image data related to the job is a monochrome image. That is, when the scan color setting is color, the amount of the image data is larger than that in the case where the scan color setting is monochrome. The higher the scanning resolution in the setting information, the higher the resolution of the image data related to the print job. Accordingly, the scanning resolution also represents the amount of the data of the job. When the number of pieces of the manuscript paper of the scan job, the copy job, or the FAX job is acquirable in advance, the number of pieces of the manuscript paper represents the logical page number of the image data related to the job.

As for a method of selecting the memory to which the data is to be written based on the attribute information about attributes of the job, when the color setting (the print color setting or the scan color setting) of the job is monochrome, for example, the memory to which the data related to the job is to be written may be the first memory 20 regardless of the write lifetime of the first memory 20. When the color setting of the job is color, and the write lifetime of the first memory 20 is equal to or more than the first lifetime threshold, the data related to the job may be written to the first memory 20. When the color setting of the job is color, and the write lifetime of the first memory 20 is less than the first lifetime threshold, the data related to the job may be written to the second memory 22. That is, only data that has a relatively large amount may be written to the second memory 22.

From the perspective of an increase in process throughput related to the job, for example, the data related to the job may be written as follows. When the logical page number of the data related to the job is more than one, the data related to the job is written to the first memory 20 regardless of the write lifetime of the first memory 20. When the logical page number of the data related to the job is one, and the write lifetime of the first memory 20 is equal to or more than the first lifetime threshold, the data related to the job is written to the first memory 20. When the logical page number of the data related to the job is one, and the write lifetime of the first memory 20 is less than the first lifetime threshold, the data related to the job is written to the second memory 22. The second memory 22 has a small storage capacity in many cases, and the throughput of the job decreases when the data related to the job is divided and written to multiple memories as described above. Accordingly, only data the logical page number of which is one is written to the second memory 22. This enables data that presumably has a small amount, that is, data that is presumably entirely written to one second memory 22 to be written to the second memory 22.

The writing unit 26 may change the attribute information about attributes of the job the data of which is to be written to the second memory 22 depending on the write lifetime of the first memory 20. In particular, as the write lifetime of the first memory 20 decreases, a target to be written as the data may be changed so that the data relating to the job having attribute information indicating that the amount of the data is smaller is the target.

Specifically, when the write lifetime of the first memory 20 is less than a second lifetime threshold that represents a lifetime longer than the first lifetime threshold and is equal to or more than the first lifetime threshold, the writing unit 26 may write first data related to a job that has a first attribute value in the attribute information to the first memory 20 and may write, to the second memory 22, second data related to a job that has a second attribute value in the attribute information that represents the amount of the data is larger than that represented by the first attribute value. When the write lifetime of the first memory 20 is less than the first lifetime threshold, the first data and the second data may be written to the second memory 22.

FIG. 2 is referred for a specific description. FIG. 2 illustrates a table that represents memories to which the data of a job is written with respect to a combination of the write lifetime of the first memory 20 and the attribute information about attributes of the job. In an example in FIG. 2, the first lifetime threshold is "1%", and the second lifetime threshold is "5%". The first attribute value is "monochrome" that is the value of the color setting in the setting information about settings of the job. The second attribute value is "color" that is the value of the color setting therein.

When the write lifetime of the first memory 20 is equal to or more than the second lifetime threshold, that is, "5%", the writing unit 26 writes data related to all of the jobs to the first memory 20. When the write lifetime of the first memory 20 is less than the second lifetime threshold and is equal to or more than the first lifetime threshold, that is, when the write lifetime of the first memory 20 is less than "5%" and "1%" or more, the writing unit 26 writes, to the first memory 20, the first data of the job that has the first attribute value of the color setting, that is, "monochrome" and writes, to the second memory 22, the second data of the job that has the second attribute value of the color setting, that is, "color". When the write lifetime of the first memory 20 is less than the first lifetime threshold, that is, "1%", the writing unit 26 writes, to the second memory 22, the first data of the job that has the first attribute value of the color setting, that is, "monochrome" and the second data of the job that has the second attribute value of the color setting, that is, "color".

As for the color setting in the example in FIG. 2, the first attribute value and the second attribute value are illustrated by way of example. The first attribute value and the second attribute value may be, for example, the scanning resolution or the logical page number of the image data.

As a premise, the period to the end of the write lifetime of the first memory 20 is to be increased as much as possible. The data related to the job, however, is written to the first memory 20 whenever possible in order to decrease a possibility that a set of data is divided and written to multiple memories because the second memory 22 has a storage capacity smaller than that of the first memory 20. Accordingly, when the write lifetime of the first memory 20 is less than the second lifetime threshold and is equal to or more than the first lifetime threshold, the writing unit 26 writes only the data of some jobs (particularly, a job the data of which presumably has a large amount and causes the lifetime of the first memory 20 to greatly decrease and the color setting of which is "color") to the second memory 22. After the write lifetime of the first memory 20 further decreases and becomes less than the first lifetime threshold, the data related to all of the jobs is written to the second memory 22.

The outline of the image processing apparatus 10 according to the exemplary embodiment is described above. The flow of processing of the image processing apparatus 10 will now be described in accordance with a flowchart illustrated in FIG. 3.

At a step S10, the image processing apparatus 10 receives a job from the user, and the writing unit 26 requests the first memory 20 to provide the state information and acquires the write lifetime of the first memory 20, based on the lifetime information that is included in the state information that is received from the first memory 20.

At a step S12, the writing unit 26 determines whether the write lifetime of the first memory 20 that is acquired at the step S10 is equal to or more than the second lifetime threshold (for example, "5%"). If the write lifetime of the first memory 20 is equal to or more than the second lifetime threshold, the flow proceeds to a step S14.

At the step S14, the writing unit 26 writes the data related to the job that is inputted at the step S10 to the first memory 20.

If the write lifetime of the first memory 20 is less than the second lifetime threshold at the step S12, the flow proceeds to a step S16.

At the step S16, the writing unit 26 determines whether the write lifetime of the first memory 20 is less than the first lifetime threshold (for example, "1%"). If the write lifetime of the first memory 20 is less than the first lifetime threshold, the flow proceeds to a step S20. If the write lifetime of the first memory 20 is not less than the first lifetime threshold, that is, if the write lifetime of the first memory 20 is less than the second lifetime threshold and is equal to or more than the first lifetime threshold, the flow proceeds to a step S18.

At the step S18, the writing unit 26 refers the attribute information about attributes of the job that is inputted at the step S10. Here, the color setting in the setting information about settings of the job is referred. If the color setting of the job is color, the flow proceeds to the step S20. If the color setting of the job is monochrome, the flow proceeds to the step S14 (that is, the writing unit 26 writes the data to the first memory 20).

At the step S20, the writing unit 26 acquires the free capacity of the second memory 22 and determines whether the free capacity of the second memory 22 is equal to or more than the free capacity threshold. If the free capacity of the second memory 22 is less than the free capacity threshold, the flow proceeds to the step S14 (that is, the writing unit 26 writes the data to the first memory 20). If the free capacity of the second memory 22 is equal to or more than the free capacity threshold, the flow proceeds a step S22.

At the step S22, the writing unit 26 writes the data related to the job that is inputted at the step S10 to the second memory 22.

At a step S24, the processor 24 reads the data that is written to the first memory 20 or the second memory 22 and causes the scanner 16 or the printer 18 to perform a process related to the job.

The exemplary embodiment of the disclosure is described above. The exemplary embodiment of the disclosure, however, is not limited to the above description. Various modifications may be made without departing from the spirit of the exemplary embodiment of the disclosure.

In the embodiments above, the term "processor" refers to hardware in a broad sense. Examples of the processor include general processors (e.g., CPU: Central Processing Unit) and dedicated processors (e.g., GPU: Graphics Processing Unit, ASIC: Application Specific Integrated Circuit, FPGA: Field Programmable Gate Array, and programmable logic device).

In the embodiments above, the term "processor" is broad enough to encompass one processor or plural processors in collaboration which are located physically apart from each other but may work cooperatively. The order of operations of the processor is not limited to one described in the embodiments above, and may be changed.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. An image processing apparatus comprising:
a first memory;
a second memory; and
a processor configured to:
write data related to a processing instruction that is inputted into the apparatus to the second memory instead of the first memory when a write lifetime of the first memory is less than a first lifetime threshold, based on state information about a state of the first memory,
wherein the processor is configured to select a memory to which the data related to the processing instruction is to be written from the first memory and the second memory, based on attribute information about an attribute of the processing instruction that represents an amount of the data related to the processing instruction,
wherein the processor is configured to:
write, to the first memory, first data related to the processing instruction that has a first attribute value in the attribute information; and
write, to the second memory, second data related to the processing instruction that has a second attribute value in the attribute information, the second attribute value representing an amount of the data is larger than that represented by the first attribute value,
when the write lifetime of the first memory is less than a second lifetime threshold that represents a lifetime longer than the first lifetime threshold and is equal to or more than the first lifetime threshold, and
wherein the processor is configured to write the first data and the second data to the second memory when the write lifetime of the first memory is less than the first lifetime threshold.

2. The image processing apparatus according to claim 1, wherein the second memory has no write lifetime.

3. The image processing apparatus according to claim 2, wherein the second memory is one of a plurality of second memories, and wherein the processor is configured to determine the second memory to which the data is to be written from the plurality of second memories, based on free capacities of the plurality of second memories.

4. The image processing apparatus according to claim 2, wherein the processor is configured to write the data to the first memory when a free capacity of the second memory is less than a free capacity threshold, and even when the write lifetime of the first memory is less than the first lifetime threshold.

5. The image processing apparatus according to claim 1, wherein the second memory is one of a plurality of second memories, and
wherein the processor is configured to determine the second memory to which the data is to be written from the plurality of second memories, based on free capacities of the plurality of second memories.

6. The image processing apparatus according to claim 1, wherein the processor is configured to write the data to the first memory when a free capacity of the second memory is less than a free capacity threshold, and even when the write lifetime of the first memory is less than the first lifetime threshold.

7. The image processing apparatus according to claim 1, wherein the first attribute value is monochrome and the second attribute value is color.

8. A non-transitory computer readable medium storing a program causing a computer that includes a first memory and a second memory to execute a process for image processing, the process comprising:
  writing data related to a processing instruction that is inputted into the apparatus to the second memory instead of the first memory when a write lifetime of the first memory is less than a first lifetime threshold, based on state information about a state of the first memory,
    selecting a memory to which the data related to the processing instruction is to be written from the first memory and the second memory, based on attribute information about an attribute of the processing instruction that represents an amount of the data related to the processing instruction,
  writing, to the first memory, first data related to the processing instruction that has a first attribute value in the attribute information; and
  writing, to the second memory, second data related to the processing instruction that has a second attribute value in the attribute information, the second attribute value representing an amount of the data is larger than that represented by the first attribute value, when the write lifetime of the first memory is less than a second lifetime threshold that represents a lifetime longer than the first lifetime threshold and is equal to or more than the first lifetime threshold, and
  writing the first data and the second data to the second memory when the write lifetime of the first memory is less than the first lifetime threshold.

9. An image processing apparatus comprising:
first storing means;
second storing means; and
means for writing data related to a processing instruction that is inputted into the apparatus to the second storing means instead of the first storing means when a write lifetime of the first storing means is less than a first lifetime threshold, based on state information about a state of the first storing means;
  means for selecting a memory to which the data related to the processing instruction is to be written from the first memory and the second memory, based on attribute information about an attribute of the processing instruction that represents an amount of the data related to the processing instruction;
  means for writing, to the first memory, first data related to the processing instruction that has a first attribute value in the attribute information; and
  means for writing, to the second memory, second data related to the processing instruction that has a second attribute value in the attribute information, the second attribute value representing an amount of the data is larger than that represented by the first attribute value, when the write lifetime of the first memory is less than a second lifetime threshold that represents a lifetime longer than the first lifetime threshold and is equal to or more than the first lifetime threshold; and
  means for writing the first data and the second data to the second memory when the write lifetime of the first memory is less than the first lifetime threshold.

* * * * *